INVENTOR
HANS R. CAMENZIND
BY
Robert Levine
ATTORNEY

INVENTOR
HANS R. CAMENZIND
BY
Robert Levine
ATTORNEY

United States Patent Office 3,445,788

Patented May 20, 1969

3,445,788

PULSE-WIDTH MODULATION CIRCUITS

Hans R. Camenzind, Lexington, Mass., assignor to P. R. Mallory & Co., Inc., Indianapolis, Ind., a corporation of Delaware Continuation of application Ser. No. 592,849, Nov. 8, 1966. This application Apr. 12, 1968, Ser. No. 721,123

Int. Cl. H03k 3/281

U.S. Cl. 331—113 25 Claims

ABSTRACT OF THE DISCLOSURE

A transistorized astable multivibrator having a capacitor-controlled duty cycle with diode-aided capacitor charging is connected to a differential control circuit for variation of the duty cycle according to a double-ended signal. The signal is coupled to the bases of a pair of transistors whose emitters are connected to a common current path and whose collectors are connected to the timing capacitors. A pair of resistors couples the collectors to a power source. A monostable form uses a single-ended input signal fed to a control circuit connected to a single timing capacitor.

This application is a continuation of application Ser. No. 592,849 filed Nov. 8, 1966 and now abandoned.

The present invention concerns pulse-width modulation circuits, and particularly relates to improvements in pulse-width modulators of the multivibrator variety.

The repetition rate, or carrier frequency, of a pulse-width modulator is often the result of a design compromise, especially when the modulator is to be used with a two-state, or "Class D," amplifier. Too high a repetition rate increases the dissipation of power in the modulator and amplifier transistors, since the switching time, during which most of the dissipation takes place, occupies a greater portion of the total cycle time. On the other hand, too low a repetition rate increases the intermodulation distortion between the carrier frequency and the modulating signal. Once the desired repetition rate has been chosen, therefore, it is necessary that it remain substantially constant regardless of changes in the multivibrator duty cycle occasioned by the modulation process. Although this objective may be attained by restricting the excursion of the duty cycle within relatively narrow limits, such a restriction would decrease the modulation depth of the system, rendering it less efficient. It is thus desirable to stabilize the multivibrator repetition rate for duty cycles substantially from zero to 100%.

Linearity of the output is another major factor in the design of pulse-width modulation systems, and in this regard also it is important that the linear relationship should be maintained over the widest range of duty cycles.

It is accordingly an object of the present invention to provide improved pulse-width modulation circuits of the multivibrator type having a constant repetition rate.

It is another object of the present invention to provide pulse-width modulation circuits having improved linearity over previous circuits of its type.

A further object of the invention is to provide such circuits having simplicity of design, ease of fabrication and an adaptability for construction in the form of integrated circuits.

A further object is to provide pulse-width modulation circuits capable of operation at high repetition rates.

Still a further object is to provide pulse-width modulation circuits including two-state amplifiers to obtain faster operation and greater switching reliability.

Another aspect of the invention relates to novel features of the instrumentalities described for teaching the objects of the invention and to the novel principles employed in the instrumentalities, whether or not those features and instrumentalities are used in the same applications herein set forth.

Other objects and advantages of the present invention, as well as modifications obvious to those skilled in the art, will appear in the following description of preferred embodiments of the invention taken in conjunction with the accompanying drawings, in which.

Generally speaking, the invention comprises a multivibrator having a variable duty cycle, a control circuit for receiving an input signal in order to control the multivibrator duty cycle and diode means to enhance the operation of the multivibrator. The first form of the invention to be described comprises an astable multivibrator having a variable duty cycle controlled by a pair of timing capacitors in conjunction with charging means therefor, a differential control circuit adapted to receive a double-ended input signal and operable to discharge the timing capacitors alternately to a voltage determined by the instantaneous voltage of the input signal, and a pair of diodes operable to charge the timing capacitors to a constant voltage.

Figures 1, 2, 3:
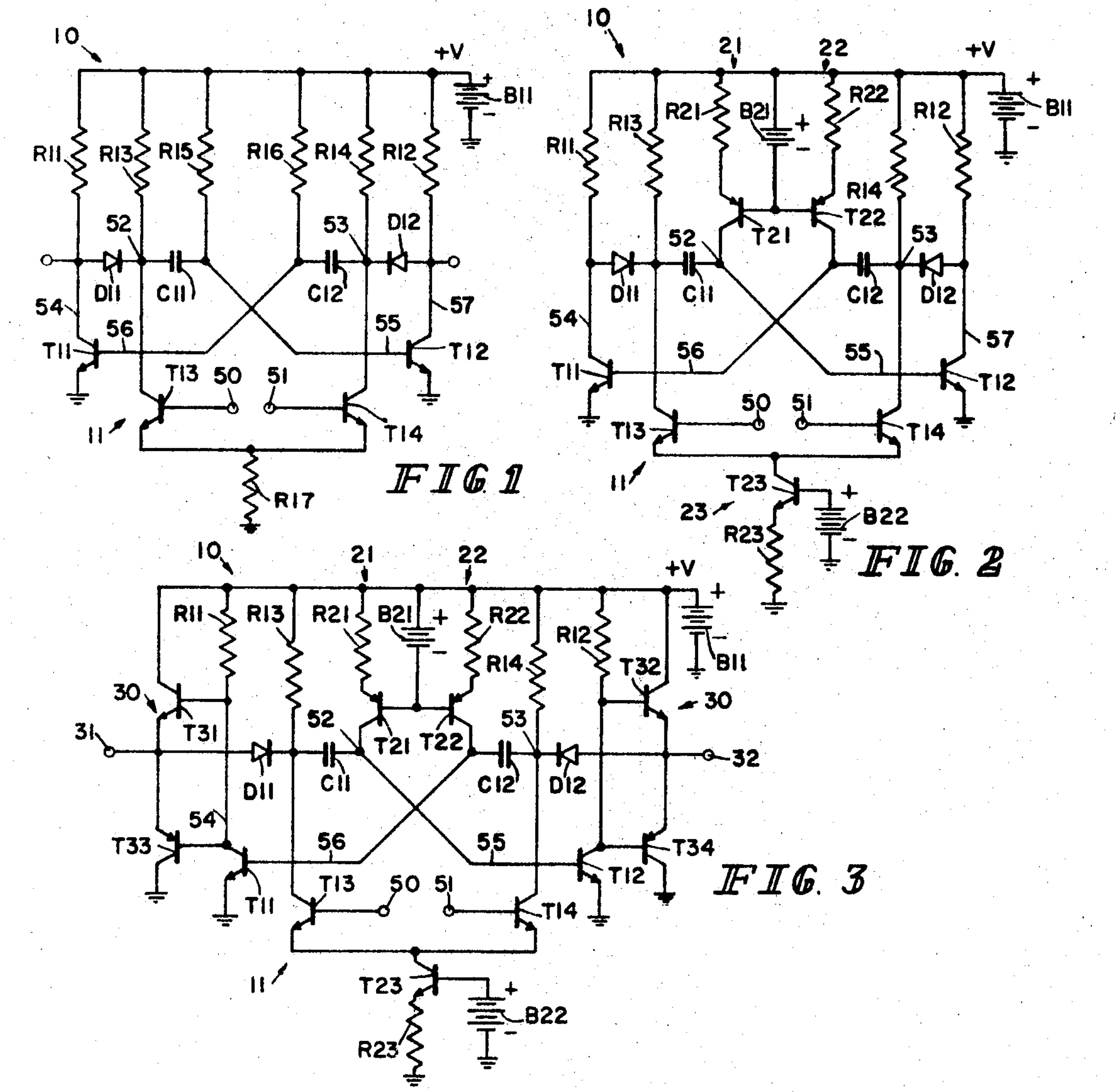
FIGURE 1 is a schematic diagram of a first form of the invention.
FIGURE 2 is a modification of the circuit of FIGURE 1.
FIGURE 3 is a modification and extension of the circuit of FIGURE 2.

Referring more particularly to the drawings, FIGURE 1 shows a basic circuit according to the invention, a description of which will serve to clarify the improved circuits of the succeeding figures. The components T11, T12, R11, R12, R15, R16, C11 and C12 constitute a conventional type of astable multivibrator, indicated generally by the numeral 10, whose duty cycle and repetition rate are controlled by the timing capacitors C11 and C12 in conjunction with the charging means R15 and R16. The components T13, T14, R13, R14 and R17 constitute a differential control circuit 11 adapted to receive the double-ended input signal 50, 51 and having a double-ended output signal 52, 53. The control circuit 11 has the appearance of a differential amplifier, but its actual function is somewhat different, as will be seen. The entire circuit of FIGURE 1 is powered by a source B11 having a constant potential of +V.

Figure 5:
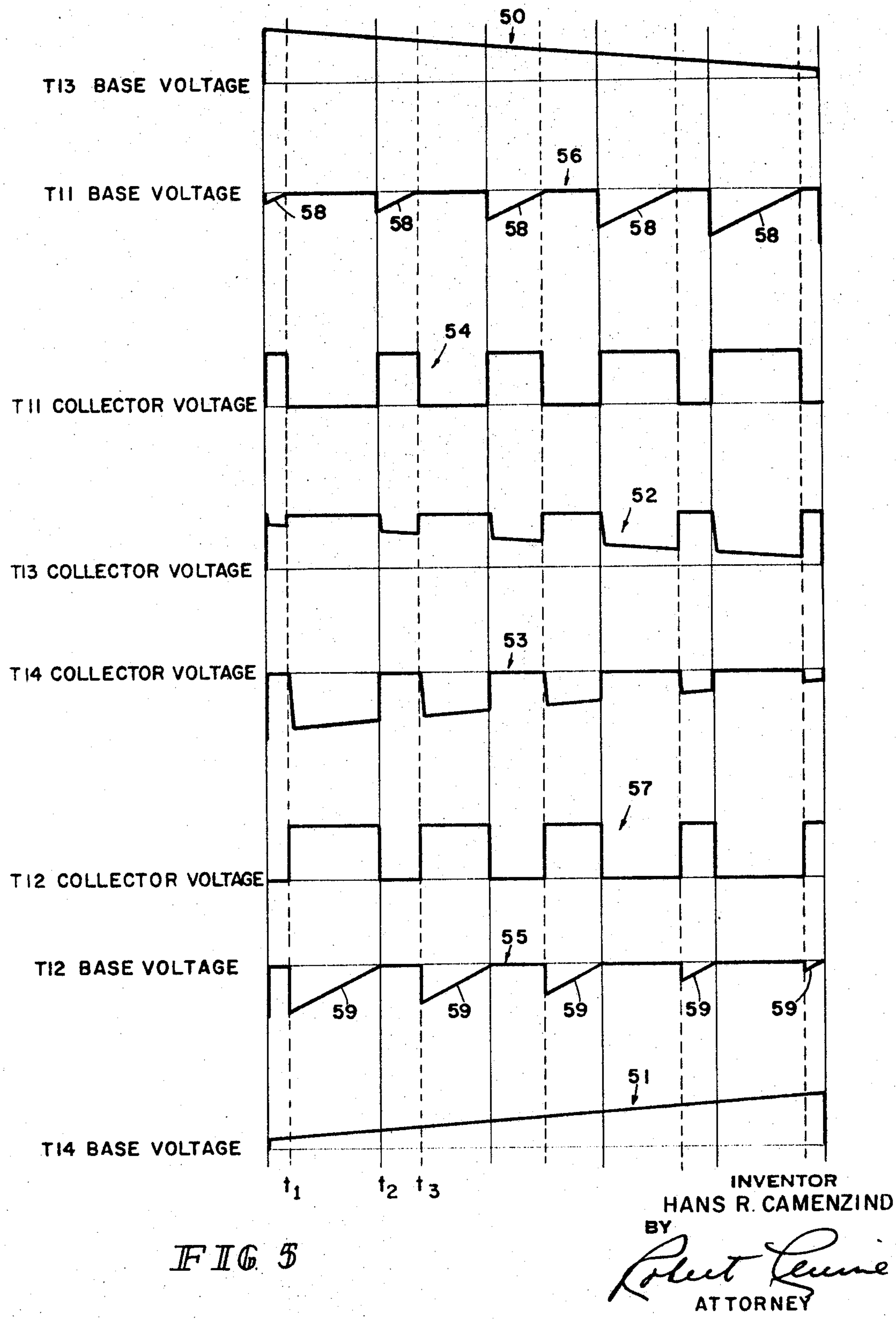
FIGURE 5 is a representation of various waveforms occurring in the circuits of the foregoing figures.

Referring to the waveforms of FIGURE 5 in conjunction with the circuit of FIGURE 1, suppose that the transistor T11 turns ON at time $t_1$, causing the collector voltage 54 to fall to zero. The resulting reverse potential across diode D11 prevents it from conducting, and the timing capacitor C11 discharges rapidly until the voltage 52 drops to a voltage determined by the instantaneous value of the input signal 50. The discharge of C11 induces a negative voltage step in the waveform 55; deprived of base current of the proper polarity, transistor T12 turns OFF. Since T12 is now essentially an open circuit, the collector voltage 57 rises to a potential of +V. The diode D12, now being forward-biased, begins to conduct, permitting charging current to flow into the timing capacitor C12 through the resistor R12.

During the period following the time $t_1$, the capacitor C11 begins to recharge toward +V through the resistor R15, the left-hand plate of C11 being held at the level determined by the input signal 50 by the action of T13. Meanwhile, base current flowing through R16 maintains T11 in an ON condition, as is shown in the waveform 56. When, as at time $t_2$, the voltage 55 becomes sufficiently high because of the charging of C11, current of the proper polarity begins to flow into the base of transistor T12, turning it ON. The conduction of T12 causes the collector voltage 57 to fall to zero and causes diode D12 to become reverse-biased. Capacitor C12 now discharges rapidly through transistor T14 and resistor R17 to a level set by the second end 51 of the double-ended input signal. The discharge of C12 induces a negative step of voltage in the waveform 56, which turns transistor T11 OFF. T11 now being an open circuit, the voltage 54 rises rapidly to +V, causing diode D11 to conduct and permitting charging current to flow into C11 through the resistor R11.

During the interval following $t_2$, the capacitor C12 begins to recharge toward +V through the resistor R16, while the right-hand plate of C12 is held at the level determined by the input signal 51. When C12 has recharged sufficiently, as at time $t_3$, base current flows into the transistor T11, turning it ON and begining the cycle anew. Since the input signal is double-ended, the waveform 50 increases as the waveform 51 decreases, so that the repetition rate of the multivibrator remains constant.

The charging of the timing capacitors C11 and C12 by means of simple resistors (R15 and R16 of FIGURE 1) results in an exponential charging voltage being applied to the timing capacitors, which leads to a nonlinear relationship between the output pulse widths of the waveforms 54 and 56 and the voltage of the input waveforms 50 and 51. The primary objective of a pulse-width modulator, however, is the attainment of a linear relationship between output pulse width and input voltage. This objective can be realized in the present invention by applying a linear charging voltage to the timing capacitors; that is, by giving the ramps 58 and 59 of the waveforms 55 and 56 the form of a straight line. The ramps could be linearized to any given degree of accuracy by utilizing sufficiently large values of capacitance in C11 and C12 and by sufficiently restricting the range of variation of the input signal 50, 51 so that the portion of the exponential curve actually used approximates a straight line. These solutions, however, are unattractive in several respects. First, the system would be unable to achieve a large modulation depth, rendering it inefficient. Secondly, the use of relatively small voltage increments would decrease the output power which would be available for a given input power; that part of the input power which does not appear as output power is, of course, dissipated as heat within the modulator. Also, the use of large capacitances would be difficult and uneconomical if construction of the circuit in integrated form is contemplated.

The pulse-width modulation circuit shown in FIGURE 2 retains the advantages of the previous circuit and has the additional advantage of greatly enhanced linearity. As may be seen from the drawings, the improved circuit replaces the resistors R15, R16 and R17 with the constant-current sources 21, 22 and 23, each of which sources comprises a resistor (R21, R22 and R23, respectively), a transistor (T21, T22 and T23) and a source of constant voltage (B21 and B22). Obviously, the voltage sources B21 and B22 may be replaced, for instance, by Zener diodes or some other form of regulator deriving power from the voltage source B11. From the relationship $$e=\frac{1}{C}\int i\,dt$$

in which $e$ is the voltage across a capacitor, C is the capacitance and $t$ represents time, it will be seen that a constant charging current $i$ will produce a linearly increasing voltage $e$. Thus the ramps 58 and 59 generated by the circuit of FIGURE 2 will be straight lines, and the output pulse widths of 54 and 57 will be linearly dependent upon the input voltages 50 and 51, regardless of wide excursions of the multivibrator duty cycle. Furthermore, since $e$ in the above formula is inversely proportional to the capacitance C, much smaller timing capacitors C11 and C12 may be used.

The upper limits of repetition rate usable in any astable multivibrator are dependent upon how fast the timing capacitors can be charged to the supply voltage (+V in the circuits shown) when the transistors of the multivibrator cease to conduct. In a conventional astable multivibrator, charging time is limited by the time constants of the collector resistors and the timing capacitors; that is, by the values of $R11\times C11$ and $R12\times C12$. It is desirable to have high values of collector resistors R11 and R12 in order to minimize power dissipation therein, but a high collector resistance results in an undesirably long charging time for the timing capacitors and in a lower turn-off current to the transistor which is to be made non-conducting. Thus a design compromise is required to balance efficiency and heat dissipation against switching speed and reliability.

The aforementioned disadvantages may be obviated and the design compromise made unnecessary by a circuit such as that of FIGURE 3. Since almost all applications involving a pulse-width modulator will also involve a further amplification of the modulated signal by a two-state amplifier (that is, one which is either fully ON or fully OFF at any given time), the amplifier may be used to enhance the operation of the modulator. The circuit of FIGURE 3 accomplishes this result in an extremely simple manner. The two-state amplifier 30 is of the complementary-symmetry type, employing four high-current transistors T31, T32, T33 and T34 arranged in a bridge configuration. The amplifier is also powered by the voltage source B11 and has a pair of output terminals 31 and 32. The modification to the modulator circuit consists of connecting the anodes of the diodes D11 and D12 to the outputs 31 and 32 of the two-state amplifier 30 rather than to the collectors of the multivibrator transistors T11 and T12. In the first state of the multivibrator 10, transistor T11 turns ON, forcing T31 to be OFF and T33 to be ON; thus the output voltage at 31 is zero and the diode D11 is reverse-biased, as described previously. In this state of the multivibrator 10, the transistor T12 is OFF, forcing T32 to be ON and T34 to be OFF; thus the voltage at 32 is at +V volts, the diode D12 is forward-biased, and charging current flows to C12, as described. The charging currents for the timing capacitors C11 and C12 are now supplied through the extremely low saturation resistance of the high-current transistors T31 and T32 rather than through the relatively large resistors R11 and R12. The availability of greatly increased charging currents to the timing capacitors allows higher multivibrator repetition rates by decreasing the charging times of the capacitors and the switching times of the multivibrator transistors; it also permits a choice of values for the resistors R11 and R12 which will optimize the performance and reduce the heat dissipation of the multivibrator, since the charging currents are no longer dependent upon R11 and R12.

Figure 4:
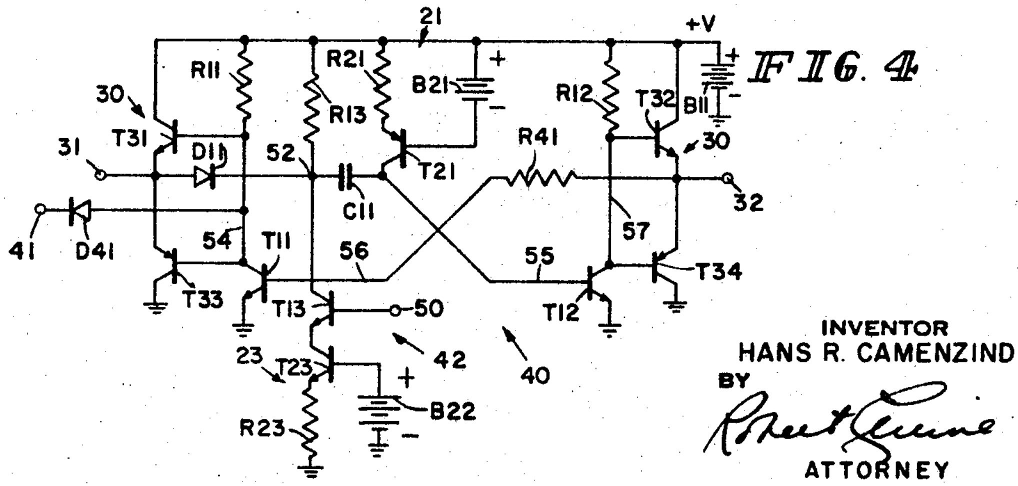
FIGURE 4 illustrates a second preferred form of the invention.

The circuit illustrated in FIGURE 4 applies the concepts of the prseent invention to a pulse-width modulator employing a variable duty cycle monostable multivibrator instead of an astable multivibrator. In this circuit, transistor T12 is located in the stable side of the monostable multivibrator indicated generally by the numeral 40. Transistor T12 is turned OFF by switching transistor T11 ON in response to a series of negative-going constant-frequency pulses received at the terminal 41 and coupled to the collector of T11 through the diode D41. These constant-frequency pulses serve to maintain the repetition rate of the multivibrator 40 constant, so that a single-ended input signal 50 and a single-ended control circuit 42 may be used to vary the duty cycle of the multivibrator. This circuit requires only two constant-current sources, 21 and 23 and only one timing capacitor, C11. The necessary base current for transistor T11 is then supplied by a resistor R41 rather than by a timing capacitor. In all other respects, this circuit operates in the same fashion as the circuits previously described.

FIGURE 4 includes the refinements presented in FIG-

URE 2 and the two-state amplifier 30 of FIGURE 3; the monostable modulator may, however, be used without such improvements. Additionally, where a double-ended output 31, 32 is not required, the monostable configuration may be simplified by using a half-bridge rather than a full-bridge amplifier 30. The half-bridge amplifier may be realized by eliminating the amplifier transistors T32 and T34 from the circuit of FIGURE 4 and by reconnecting the resistor R41 to the collector of T12; since no timing capacitor is employed in the base lead of T11, no capacitive charging current is required to switch T11 and no degradation of performance will result from supplying base current to T11 through the collector resistor R12.

I claim:

1. A pulse-width modulator, comprising: an astable multivibrator having a first pair of cross-coupled transistor means and having a pair of timing capacitors and charging means therefor for switching said transistor means between high and low conductivity states; a pair of output terminals coupled to said first pair of transistor means; and a differential control circuit for varying the duty cycle of said multivibrator in accordance with a double-ended input signal while maintaining the repetition rate of said multivibrator substantially constant, said control circuit having a pair of diodes connected from said output terminals to said timing capacitors, a pair of resistors connected from a voltage source to the junctions between said capacitors and said diodes, and a second pair of transistor means provided with output and common electrodes coupled from said junctions to said voltage source and with input electrodes for receiving said double-ended input signal.

2. A pulse-width modulator according to claim 1 wherein said charging means comprise a pair of resistors connected from said timing capacitors to said voltage source.

3. A pulse-width modulator according to claim 1 wherein said charging means comprise a pair of constant-current sources.

4. A pulse-width modulator according to claim 1 wherein said differential control circuit further has a common current path connected from said voltage source to the common electrodes of said second pair of transistor means.

5. A pulse-width modulator according to claim 4 wherein said common current path includes a resistor.

6. A pulse-width modulator according to claim 4 wherein said common current path includes a constant-current source.

7. A pulse-width modulator according to claim 1, further comprising a two-state amplifier connected between said first pair of transistor means and said output terminals.

8. A pulse-width modulator according to claim 7 wherein said two-state amplifier comprises a plurality of transistor means connected in a bridge configuration.

9. A pulse-width modulator, comprising: a monostable multivibrator having a pair of cross-coupled transistor means and having a timing capacitor and charging means therefor for switching said transistor means between high and low conductivity states; an output terminal coupled to one of said transistor means; and a control circuit for varying the duty cycle of said monostable multivibrator in accordance with a single-ended input signal, said control circuit having a diode connected from said output terminal to said capacitor, a resistor connected between a voltage source and the junction between said diode and said capacitor, and transistor means provided with output and common electrodes coupled from said junction to said voltage source and with an input electrode for receiving said single-ended input signal.

10. A pulse-width modulator according to claim 9 wherein said charging means is a constant-current source.

11. A pulse-width modulator according to claim 9 wherein said control circuit further has a constant-current source connected from said voltage source to the common electrode of said control-circuit transistor means.

12. A pulse-width modulator according to claim 9, further comprising a terminal coupled to one of said pair of transistor means for receiving a constant-frequency signal, whereby the repetition rate of said monostable multivibrator is maintained substantially constant.

13. A pulse-width modulator according to claim 9, further comprising a two-state amplifier connected between said pair of transistor means and said output terminal.

14. A pulse-width modulator according to claim 13 wherein said two-state amplifier comprises a plurality of transistor means connected in a half-bridge configuration.

15. A pulse-width modulator according to claim 13, further comprising an additional output terminal coupled to one of said pair of transistor means, and wherein said two-state amplifier comprises a plurality of transistor means connected in a full-bridge configuration between said pair of transistor means and said output terminals.

16. A pulse-width modulator, comprising: first and second cross-coupled transistor means having common electrodes connected to a voltage source and having input and output electrodes; first and second resistors connected from said output electrodes to said voltage source; an output terminal coupled to the output electrode of said first transistor means; a diode connected to said output terminal; a third resistor connected from said voltage source to said diode; a timing capacitor connected from said diode and said third resistor to the input electrode of said second transistor means; charging means connected from said timing capacitor and the input electrode of said second transistor means to said voltage source; and third transistor means having output and common electrodes coupled from said diode, said third resistor and said timing capacitor to said voltage source and having an input electrode for receiving an input signal.

17. A pulse-width modulator according to claim 16 wherein said charging means comprises a constant-current source.

18. A pulse-width modulator according to claim 16, further comprising a constant-current source connected between said voltage source and the common electrode of said third transistor means.

19. A pulse-width modulator in accordance with claim 16, further comprising a terminal connected to the output electrode of said first transistor means for receiving a constant-frequency signal; and a fifth resistor connected between the input electrode of said first transistor means and the output electrode of said second transistor means.

20. A pulse-width modulator according to claim 16, further comprising a two-state amplifier connected between the output electrode of said first transistor means and said output terminal.

21. A pulse-width modulator according to claim 20 wherein said two-state amplifier comprises a plurality of transistors connected in a half-bridge configuration.

22. A pulse-width modulator according to claim 16, further comprising a second output terminal coupled to the output electrode of said second transistor means; a second diode connected to said second output terminal; a fourth resistor connected from said voltage source to said second diode; a second timing capacitor connected from said second diode and said third resistor to the input electrode of said first transistor means; second charging means connected from said second timing capacitor and the input electrode of said first transistor means to said voltage source; and fourth transistor means having output and common electrodes coupled from said second diode, said fourth resistor and said second timing capacitor to said voltage source and having an input electrode for receiving, in conjunction with the input electrode of said third transistor means, a double-ended input signal.

23. A pulse-width modulator according to claim 22 wherein said charging means comprise a pair of constant-current sources.

24. A pulse-width modulator according to claim 22, further comprising a constant-current source connected between the common electrodes of said third and fourth transistor means and said voltage source.

25. A pulse-width modulator according to claim 22, further comprising a two-state amplifier having a plurality of transistor means in a bridge configuration, said amplifier being connected between the output electrodes of said first and second transistor means and said output terminals.

References Cited

UNITED STATES PATENTS

| | | | |
|---|---|---|---|
| 2,888,579 | 5/1959 | Wanlass | 331—113 |
| 3,010,078 | 11/1961 | Stefanov | 331—113 |
| 3,230,477 | 1/1966 | Helsdon | 331—113 |
| 3,303,353 | 2/1967 | Sacha. | |

OTHER REFERENCES

C. J. Dakin: Electronics, "Novel Mult. Test Tape Transports," pp. 40–43, Feb. 14, 1964.

S. Culp: Electronic Design, "A Simple Way to Speed MV Recovery," pp. 52, 53, 54, Nov. 23, 1964.

JOHN KOMINSKI, *Primary Examiner.*

U.S. Cl. X.R.

307—273; 328—194, 200, 207; 332—14